United States Patent
Tracht et al.

(10) Patent No.: US 8,167,333 B2
(45) Date of Patent: May 1, 2012

(54) SECURED FORCE CONCENTRATOR IN A VEHICULAR BOLSTER FOR AIRBAG RETENTION AND DEPLOYMENT

(75) Inventors: Michael L. Tracht, Ingolstadt (DE); Richard G. Dierl, Sandersdoft (DE)

(73) Assignee: Lear Corporation, Southfield, MI (US)

( * ) Notice: Subject to any disclaimer, the term of this patent is extended or adjusted under 35 U.S.C. 154(b) by 301 days.

(21) Appl. No.: 11/779,594

(22) Filed: Jul. 18, 2007

(65) Prior Publication Data

US 2008/0111405 A1    May 15, 2008

(30) Foreign Application Priority Data

Nov. 14, 2006    (DE) .......................... 10 2006 053 601

(51) Int. Cl.
*B60R 21/16* (2006.01)
(52) U.S. Cl. .................................... 280/730.2
(58) Field of Classification Search ................ 280/730.2
See application file for complete search history.

(56) References Cited

U.S. PATENT DOCUMENTS

| | | | |
|---|---|---|---|
| 5,553,887 A * | 9/1996 | Karlow et al. ............ | 280/730.2 |
| 5,678,853 A | 10/1997 | Maly | |
| 5,810,389 A | 9/1998 | Yamaji et al. | |
| 5,816,610 A | 10/1998 | Higashiura et al. | |
| 5,860,673 A | 1/1999 | Hasegawa et al. | |
| 5,927,749 A | 7/1999 | Homier et al. | |
| 5,938,232 A | 8/1999 | Kalandek et al. | |
| 5,967,603 A | 10/1999 | Genders et al. | |
| 5,997,032 A | 12/1999 | Miwa et al. | |
| 6,045,151 A | 4/2000 | Wu | |
| 6,206,466 B1 | 3/2001 | Komatsu | |
| 6,237,934 B1 | 5/2001 | Harrell et al. | |
| 6,254,122 B1 | 7/2001 | Wu et al. | |
| 6,352,304 B1 | 3/2002 | Sorgenfrei | |
| 6,481,744 B2 | 11/2002 | Melia | |
| 6,588,838 B1 | 7/2003 | Dick, Jr. et al. | |
| 7,093,851 B2 | 8/2006 | Lotspih | |
| 7,100,992 B2 | 9/2006 | Bargheer et al. | |
| 7,311,325 B2 | 12/2007 | Tracht et al. | |
| 2005/0156412 A1 * | 7/2005 | Panagos et al. ............ | 280/730.2 |
| 2006/0113763 A1 | 6/2006 | Tracht et al. | |
| 2006/0113773 A1 * | 6/2006 | Tracht ........................ | 280/730.2 |

FOREIGN PATENT DOCUMENTS

| | | |
|---|---|---|
| DE | 102005057443 A1 | 6/2006 |
| DE | 102005057443 A1 | 8/2006 |
| EP | 1069004 A2 | 1/2001 |
| EP | 1023206 B1 | 8/2004 |
| GB | 2420754 A | 6/2006 |
| WO | 9915375 | 4/1999 |

OTHER PUBLICATIONS

German Patent Application No. 10 2006 053 601.0-56; Office Action dated Jan. 29, 2008.

* cited by examiner

*Primary Examiner* — Eric Culbreth
(74) *Attorney, Agent, or Firm* — Brooks Kushman P.C.

(57) ABSTRACT

A vehicle seat assembly includes a frame for mounting the seat to a vehicle. The seat assembly also includes a seat pad molded from a polymeric material and located proximate the frame. A trim cover is disposed over the seat pad, and includes a seam adjacent a side of the seat pad. An airbag assembly, which includes an airbag and an inflator configured to supply gas to the airbag, is also part of the seat assembly. A force concentrator covers at least a portion of the seat pad for protecting it during deployment of the airbag. The force concentrator includes inner and outer panels which form a deployment channel for the airbag, and thereby inhibit contact of the airbag with the seat pad as the airbag deploys.

8 Claims, 2 Drawing Sheets

SECURED FORCE CONCENTRATOR IN A VEHICULAR BOLSTER FOR AIRBAG RETENTION AND DEPLOYMENT

CROSS-REFERENCE TO RELATED APPLICATIONS

This application claims foreign priority benefits under 35 U.S.C. §119(a)-(d) to DE 10 2006 053 601.0, filed Nov. 14, 2006, which is hereby incorporated by reference in its entirety.

DESCRIPTION

1. Field of the Invention

The invention relates to a vehicle seat assembly, and in particular, a seat assembly with a secured force concentrator in a bolster thereof for retaining and deploying a side airbag.

2. Background Art

Vehicles today are often equipped with side airbags. They may take the form of an airbag disposed within the seat back or cushion of a vehicle seat assembly. One limitation of airbags that are located within a seat assembly is that the airbag needs to break through the seating material before it can fully deploy to protect a vehicle occupant. During deployment, such an airbag may encounter foam or other seat pad materials. It must then break through a seat trim cover in order to escape from the seat assembly.

A number of attempts have been made to facilitate deployment of airbags from and through a vehicle seat assembly. One such device is described in U.S. Pat. No. 5,816,610 issued to Higashiura et al. on Oct. 6, 1998. Higashiura et al. describes a seat structure having a side impact airbag apparatus. A side bolster pad of the seat structure may be made from foam, in which case the airbag apparatus is surrounded by a lining member. The lining member has a perforation to facilitate its breaking when the airbag deploys. The side bolster itself is covered with a surface layer having a seam almost directly opposite the perforation in the lining member. In this way, the airbag deploys through the perforation in the lining member, breaks through the foam of the seat pad, and exits the seat structure through the seam in the surface layer. One limitation of the seat structure described in Higashiura et al. is that the airbag must deploy through the seat pad before exiting the seat structure. In particular, the airbag, which may be moving with very high velocity, impacts the foam seat pad as it exits the seat structure. This can cause pieces of the seat pad to be expelled from the seat as the airbag exits the seat cover. Therefore, a need exists for a seat assembly that includes protection for the seat pad from the deploying airbag.

Another device is described in U.S. Pat. No. 6,045,151 which issued to Wu on Apr. 4, 2000. Wu describes a seat assembly including a side airbag with a force concentrator that surrounds the airbag to concentrate and direct the force of the inflating airbag by a pre-determined deployment seam so that the seam may rupture and allow the airbag to deploy therethrough. Wu discloses two embodiments of the force concentrator: (1) a layer of sheet material joined to the inside of the trim cover; and (2) a sleeve or pocket of sheet material which entirely surrounds the airbag module. '151 Patent, col. 2, lines 51-65.

Other patents of interest include U.S. Pat. No. 5,816,610 which issued to Higashiura et al. on Oct. 6, 1998; U.S. Pat. No. 5,860,673 which issued to Hasegawa et al. on Jan. 19, 1999; U.S. Pat. No. 5,927,749 which issued to Homier et al. on Jul. 27, 1999; and U.S. Pat. No. 6,206,410 which issued to Brown on Mar. 27, 2001.

SUMMARY OF THE INVENTION

The prior art leaves at least partially unsolved the problem of designing and assembling vehicle seats with a side airbag that can be deployed consistently, regardless of the physical properties of the seat trim cover and seat foam pad.

It would be useful to have a seat with a side airbag, the deployment of which does not vary significantly over time, regardless of the extent of wear and imperfection or damage sustained by the trim cover.

The present invention provides a vehicle seat assembly including a seat pad and a force concentrator configured to facilitate the manufacturing process and protect the seat pad during deployment of an airbag from within the side bolster.

The invention further provides a vehicle seat assembly including a frame for mounting the seat to the vehicle. A seat pad is disposed proximate the frame. A trim cover is disposed at least partially over the seat pad, and includes a seam adjacent a side of the seat pad. An airbag assembly is provided, which includes an airbag and an inflator which is configured to supply gas to the airbag, thereby facilitating its deployment. A force concentrator covers at least a portion of the seat pad for protecting the seat pad during deployment of the airbag. The force concentrator includes multiple panels—preferably, inner and outer panels—that form a deployment channel therebetween for the airbag, thereby avoiding contact of the airbag with the seat pad during deployment during expansion.

For added rigidity, in one embodiment, the inner panel has one end secured to a frame member. The outer panel, in some embodiments, fastens, for example, by a hook to the airbag module itself.

The panels of the force concentrator cooperate with each other such that deployment of the airbag along the deployment channel moves a portion of the seat pad away from the deploying airbag, while avoiding contact between the seat pad and the deploying airbag. The orientation of the deployment channel facilitates deployment of the airbag through the seam in the trim cover so that substantially all of the deployment forces are directed to the deployment channel, thereby increasing the speed at which the airbag deploys.

DETAILED DESCRIPTION OF THE PREFERRED EMBODIMENT(S)

The invention relates to the integration of a multi-part, preferably a two-part panel—the inner and the outer panel—in a rear backrest or cushion of a seat that is mounted in a vehicle. As used herein, the terms "inner" and "outer" respectively are used in relation to proximity to the vehicle seat occupant and the vehicle door.

Figure 1:
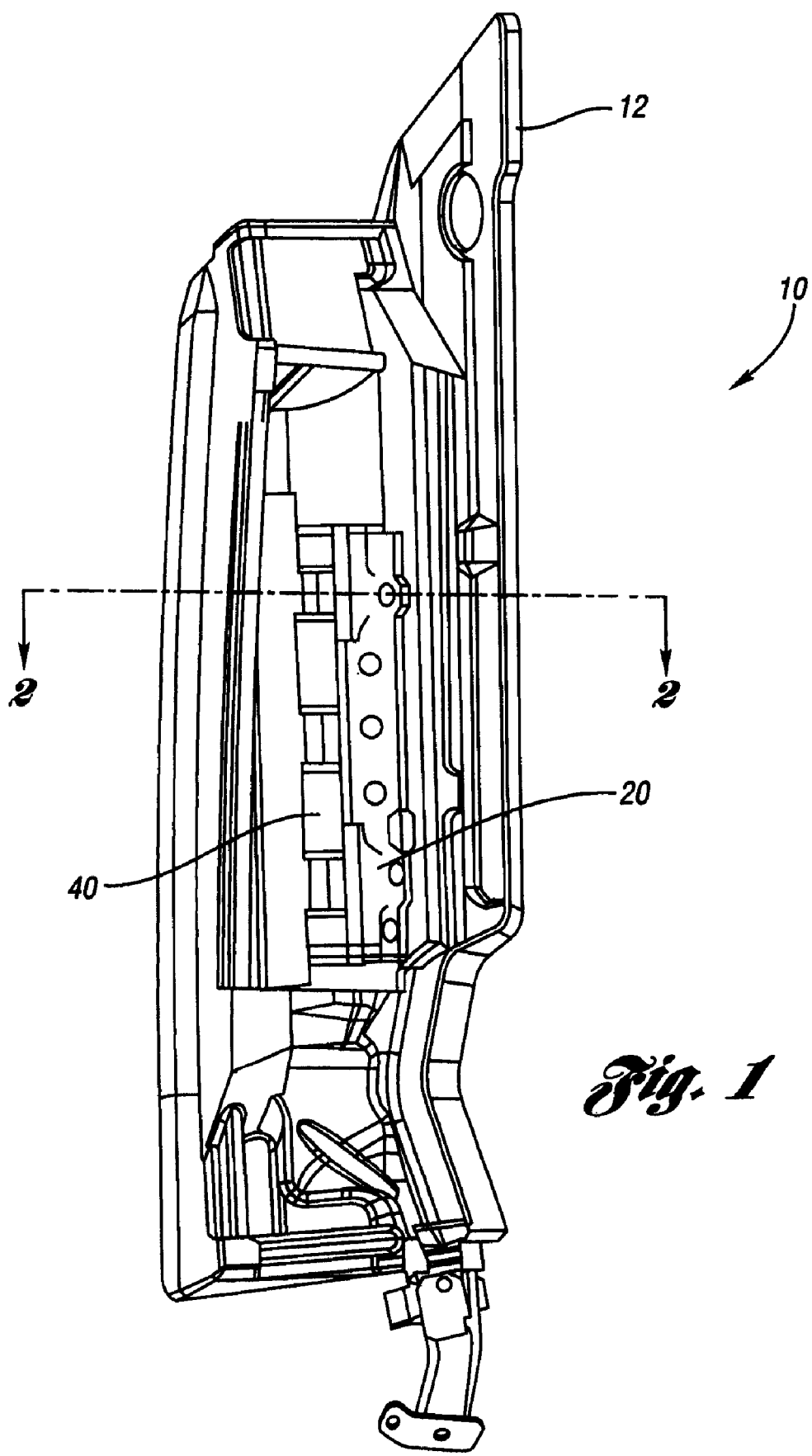
FIG. 1 is a quartering perspective view of a portion of the backrest of a seat assembly in accordance with the present invention.

FIG. 1 shows a portion—for example, a rear side bolster—of a seat assembly 10 in accordance with the present invention. It should be realized that although a rear side bolster is illustrated, the invention is not so limited. The invention can reside in any seatback or seat cushion. The seat assembly 10 (FIGS. 1, 2) includes a side bolster 12 and seat pad 16 that is at least partially covered by a trim cover 18. The seat pad 16 preferably is made from a molded polymeric material, such as a polyurethane foam. The use of a polymeric foam material to construct the seat pad 16 is cost effective and provides the flexibility needed to change the shape of the seat pad for different types of seat assemblies. Of course, other types of polymeric materials may be molded to form the seat pad 16.

Figure 2:
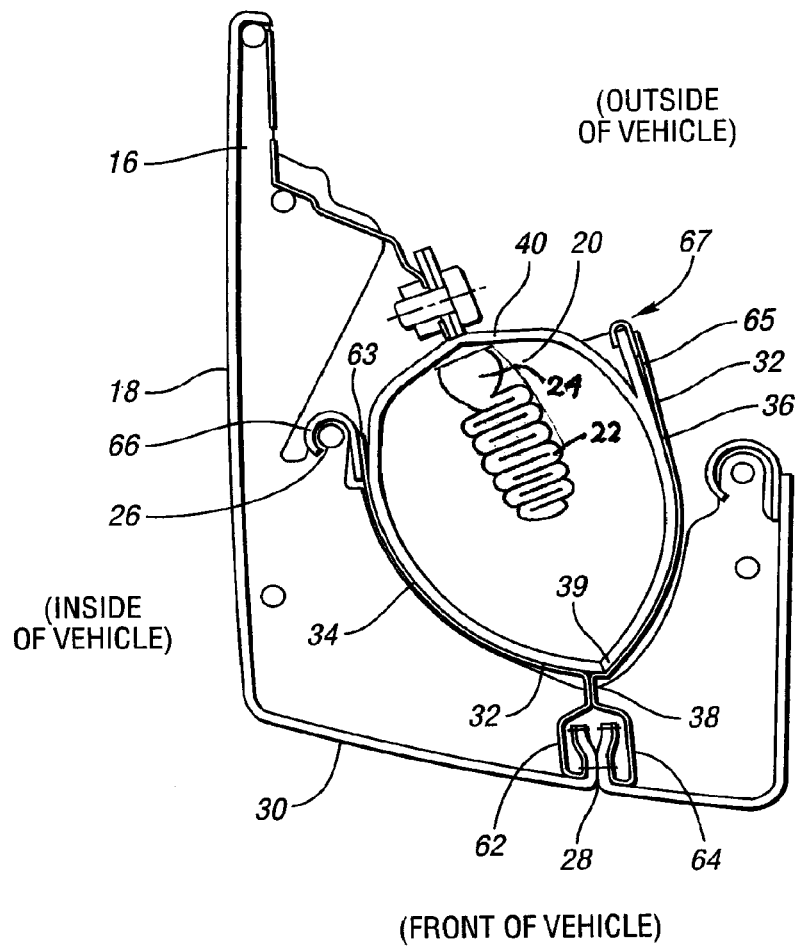
FIG. 2 is a sectional view of inner and outer panels of a force concentrator located in the seat assembly shown in FIG. 1, taken through the line 2-2.

Disposed within the side bolster 12 is an airbag assembly or module 20. As shown in FIG. 2, the airbag assembly 20 includes an airbag and an inflator 24, which is configured to supply gas to the airbag 22, thereby facilitating deployment of the airbag 22. Also shown in FIG. 2 is a portion of a seat frame 26 which can be used for mounting the airbag assembly 20 to the seat assembly 10. The seat pad 16 is disposed proximate the frame 26 and may be directly attached to the frame 26 at various locations.

The trim cover 18 includes a seam 28 which is adjacent to a side 30 or another side of the seat pad 16. It should be appreciated that the seam 28 is a tear seam that could be located on the trim in front of the module or at other locations that are generally in the direction of deployment of the airbag from the module. Covering at least a portion of the seat pad 16 is a force concentrator 32 which protects the seat pad 16 during deployment of the airbag 22. Inner (first) and outer (second) panels also have the function of directing the force of the deploying airbag directly into the tear seam. The forces of deployment are initially directed against members by which the housing is secured in relation to the frame of the seat. The deployment forces then are exerted against the panels 34, 36, thereby focusing deployment forces upon the seam 28 without significant diversion.

Comprising inner 34 and outer 36 panels, the force concentrator 32 may be made from any material effective to protect the seat pad 16 during deployment of the airbag 22. For example, a woven or non-woven cloth material, which may include natural or synthetic materials such as nylon. One material that is found to be effective is a polyamide material, of the type from which the airbag 22 may be manufactured. Regardless of the type of material used to make the force concentrator 32, the use of the force concentrator 32 can reduce friction on the airbag 22 as it deploys. Although a polymer such as nylon may be particularly beneficial, even a fleece material will help reduce the friction on the airbag 22. This is because the force concentrator 32 inhibits contact between the deploying airbag 22 and the seat pad 16.

In the embodiment shown in FIG. 2, the force concentrator 32 effectively prohibits all contact between the deploying airbag 22 and the seat pad 16. This helps to prevent energy loss from the airbag 22 by decreasing friction and protecting the seat pad 16 from damage. This, in turn, helps to reduce the deployment time of the airbag 22.

As shown in FIG. 2, the force concentrator 32 includes inner and outer panels 34, 36 which form a deployment channel 38 for the airbag 22. As the airbag 22 deploys from the housing 40 through the deployment channel 38, the force concentrator 32 inhibits contact between the airbag 22 and the seat pad 16. Thus, portions of the seat pad 16 are moved away from the airbag 22 as it deploys through the deployment channel 38.

The deployment channel 38 is oriented to facilitate deployment of the airbag 22 through the seam 28 in the trim cover 18.

In particular, the airbag assembly 20 includes a housing 40 which at least partially surrounds the airbag 22 and the inflator 24, as schematically depicted in FIG. 2. The housing 40 can resemble a clamshell cover with its split line 39 oriented toward the tear seam 28. The housing 40 includes a frangible portion which is broken by the airbag as it deploys. The frangible portion is disposed opposite the deployment channel 38 to facilitate deployment of the airbag along the channel 38 and out from the seam 28.

Although the airbag housing 40 comprises a relatively rigid material, in other embodiments, a thin sheet of material may be used in place of a rigid housing. In such embodiments, the sheet may contain a frangible portion, as its properties will be such that it will tear as the airbag 22 deploys.

Figure 3:
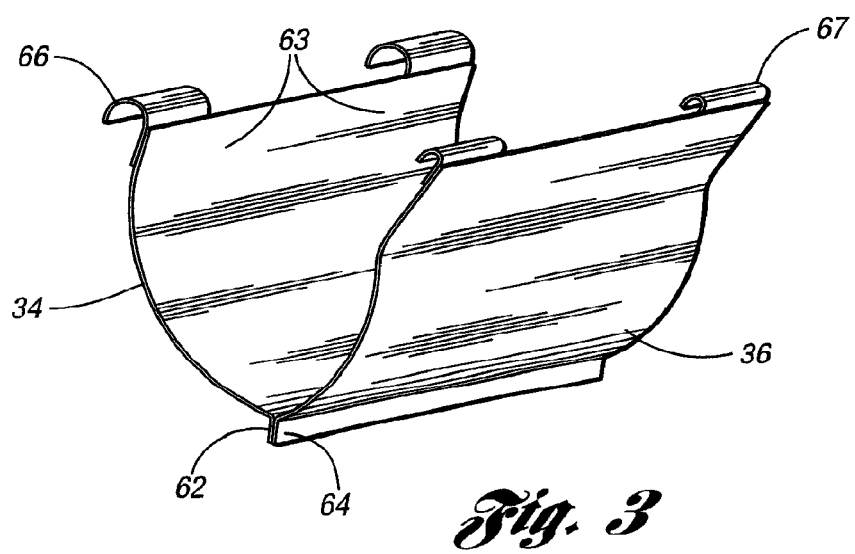
FIG. 3 is a quartering perspective view of the panels in isolation from the view of FIG. 1 with the airbag and most of the housing removed, in which the panels are attached to a structural member of the seatback and to part of the housing.

As shown in FIGS. 2-3, the inner and outer panels 34, 36 of the force concentrator 32 respectively include ends 62, 64 that are attached to the trim cover 18 at the seam 28. This configuration helps to facilitate deployment of the airbag 22 through the seam 28. The deployment channel 38 opens as the airbag 22 is deployed, thereby causing the panels 34, 36 to exert an outward force on the trim cover 18 at the seam 28. This ruptures the seam 28 and provides an exit path for the airbag 22.

The airbag seam 28 preferably is sewn through the edges of ends 62 and 64 with both sides of the trim between them. It will thus be appreciated that in most embodiments, the seam 28 extends between all four layers.

As mentioned earlier, the force concentrator 32 includes two separate panels 34, 36. In FIG. 3 the end 62 of the inner panel 34 of the force concentrator 32 is attached at the seam 28 (FIG. 2) of the trim cover 18. A distal end 63 of the inner panel 34 of the force concentrator 32 is attached to the seat frame 26. This provides a convenient means for securely attaching the inner panel 34 of the force concentrator 32.

Similarly, the seam end 64 of the outer panel 36 of the force concentrator 32 is attached at the seam 28 of the trim cover 18. A distal end 65 of the outer panel 36 of the force concentrator 32 may be attached to the side airbag module 20.

Thus, the force concentrator 32 not only provides a deployment channel for the airbag 22, but also protects the seat pad 16 from damage during high velocity deployment.

In FIG. 3, reference numerals 66, 67, respectively, designate retainers, for example, one or more J-clamps, that respectively affix the distal ends 63, 65 of the inner and outer panels to the seat frame 26 and to the side airbag module 20. It will be appreciated that the retainers 66, 67 have a shape that is not limited to those depicted in FIG. 3.

It will also be appreciated that, if desired, depending upon the application, the inner panel 34 may be affixed to the side airbag module 20. Alternatively also, the outer panel 36 may have a distal end 65 that is secured to a portion of the seat frame 26.

One methodology by which the pad, trim, and airbag module may be affixed to a side bolster is as follows:

A. Placing the bolster, which includes the wire frame that preferably is molded in situ, with the deployment channel opening upwardly;

B. Placing the trim on top of the bolster, while aligning the airbag seam with the opening of the deployment channel;

C. Feeding the panels, which are sewn to the trim, into and through the deployment channel;

D. Affixing the trim to the bolster (e.g., by retainers or other fasteners);

E. Mounting the inner panel to the wire frame as shown in FIGS. 2-3;

F. Fastening the outer panel to the side airbag module or as shown in FIGS. 2-3;

G. Placing the airbag module between the inner and outer panels, and into the cavity of the bolster; and H. Feeding threaded bolts through the holes of the airbag housing.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly, comprising:
   a frame for mounting the seat assembly to a vehicle;
   a seat pad disposed proximate to the frame with a portion or portions spaced apart from the frame;
   a trim cover disposed over at least a part of the seat pad and including a seam adjacent a side of the seat pad;
   an airbag assembly securely attached to the frame so that rigid reaction surfaces are provided against which forces of deployment may be exerted, the airbag assembly including an airbag and an inflator configured to supply gas to the airbag, the airbag assembly having a clamshell housing at least partially surrounding the airbag, the clamshell housing including a frangible split line proximate to and offset from the seam to facilitate deployment of the airbag along an uninterrupted deployment channel so that upon airbag deployment, the frangible split line breaks and the clamshell housing opens and applies a rupturing force at each side of and across the seam;
   a force concentrator covering at least a portion of the seat pad for protecting the seat pad during the deployment of the airbag, the force concentrator including inner and outer panels and forming the deployment channel therebetween for the airbag;
   the inner panel extending substantially along an entire side of the clamshell housing, the inner panel including a distal end secured to the frame, the inner panel interfacing with the seat pad along substantially all of the inner panel; and
   the outer panel extending substantially along an entire other side of the clamshell housing, the outer panel having a distal end secured to the airbag assembly, the outer panel interfacing with the seat pad at only a part of the outer panel to facilitate assembly.

2. The vehicle seat assembly of claim 1, wherein the deployment channel is oriented to facilitate deployment of the airbag through the seam in the trim cover.

3. The vehicle seat assembly of claim 1, wherein the inner and outer panels of the force concentrator each include a proximal end attached to the trim cover at the seam.

4. The vehicle seat assembly of claim 1, wherein the inner and outer panels cooperate to form the deployment channel proximate the front of the airbag housing.

5. The vehicle seat assembly of claim 4, wherein the panels and the trim cover are sewn together by the seam.

6. The vehicle seat assembly of claim 1, wherein the inner panel has a proximal seam end attached to the trim cover at the seam.

7. The airbag assembly of claim 1, wherein the outer panel has a proximal seam end secured to the trim cover at the seam.

8. A method of producing the vehicle seat assembly of claim 1, comprising the steps of:
   A. installing the seat pad, which includes the frame with the deployment channel;
   B. placing the trim cover on the seat pad, while aligning the airbag seam with the opening of the deployment channel;
   C. feeding the force concentrator with its inner and outer panels, which are sewn to the seam, into and through the deployment channel;
   D. affixing the cover to the seat pad;
   E. affixing the inner panel to the frame;
   F. placing the airbag assembly between the inner and outer panels and into the seat pad, the airbag assembly having the clamshell housing and the split line adjacent the seam that opens against the inner and outer panels of the force concentrator, so that the inner and outer panels interface substantially along entire sides of the clamshell housing and directing deployment along a deployment channel;
   G. fastening the outer panel to the airbag module; and
   H. securing the airbag housing to the frame, thereby providing a rigid reaction surface against which the forces of deployment may be exerted to rupture the seam.

* * * * *